United States Patent [19]

Threlkeld

[11] Patent Number: 4,730,699

[45] Date of Patent: Mar. 15, 1988

[54] PORTABLE TREE STAND FOR HUNTERS

[76] Inventor: Robert G. Threlkeld, Rt. 3, Box 85B, Moberly, Mo. 65270

[21] Appl. No.: 66,230

[22] Filed: Jun. 25, 1987

[51] Int. Cl.$^4$ .................... A01M 31/02; A45F 3/26; A47C 9/10
[52] U.S. Cl. .................................. 182/187; 108/152
[58] Field of Search ................. 182/187, 188; 108/152

[56] References Cited

U.S. PATENT DOCUMENTS

| | | | |
|---|---|---|---|
| 3,358,789 | 12/1967 | Laun | 182/187 |
| 3,392,802 | 7/1968 | Moore | 182/187 |
| 3,396,818 | 8/1968 | Moragne | 182/187 |
| 3,493,080 | 2/1970 | Ehlert | 182/187 |
| 3,749,200 | 7/1973 | Meyer | 182/187 |
| 4,069,891 | 1/1978 | McClung | 182/187 |
| 4,129,198 | 12/1978 | Hunter | 182/187 |

Primary Examiner—Reinaldo P. Machado

Attorney, Agent, or Firm—Schmidt, Johnson, Hovey & Williams

[57] ABSTRACT

A compact, easily transportable hunting stand for use by archery hunters or the like is provided which exhibits a high degree of stability when attached to a tree trunk and includes a unique mechanism for permitting precise leveling of the stand. Preferably, the tree stand of the invention includes a platform together with platform mounting means including a leveling screw mechanism permitting the stand to be attached to irregular tree trunks. Further, the mounting structure for the stand platform comprises compression struts and essentially eliminates tensile chains or cables extending about the stand platform; as such, the hunter is allowed complete freedom of movement and the stand seat may be rotated for a full 360 degrees to afford maximum visibility and freedom of action. In its collapsed condition, the stand may be carried on the back of a hunter in the manner of a backpack.

4 Claims, 6 Drawing Figures

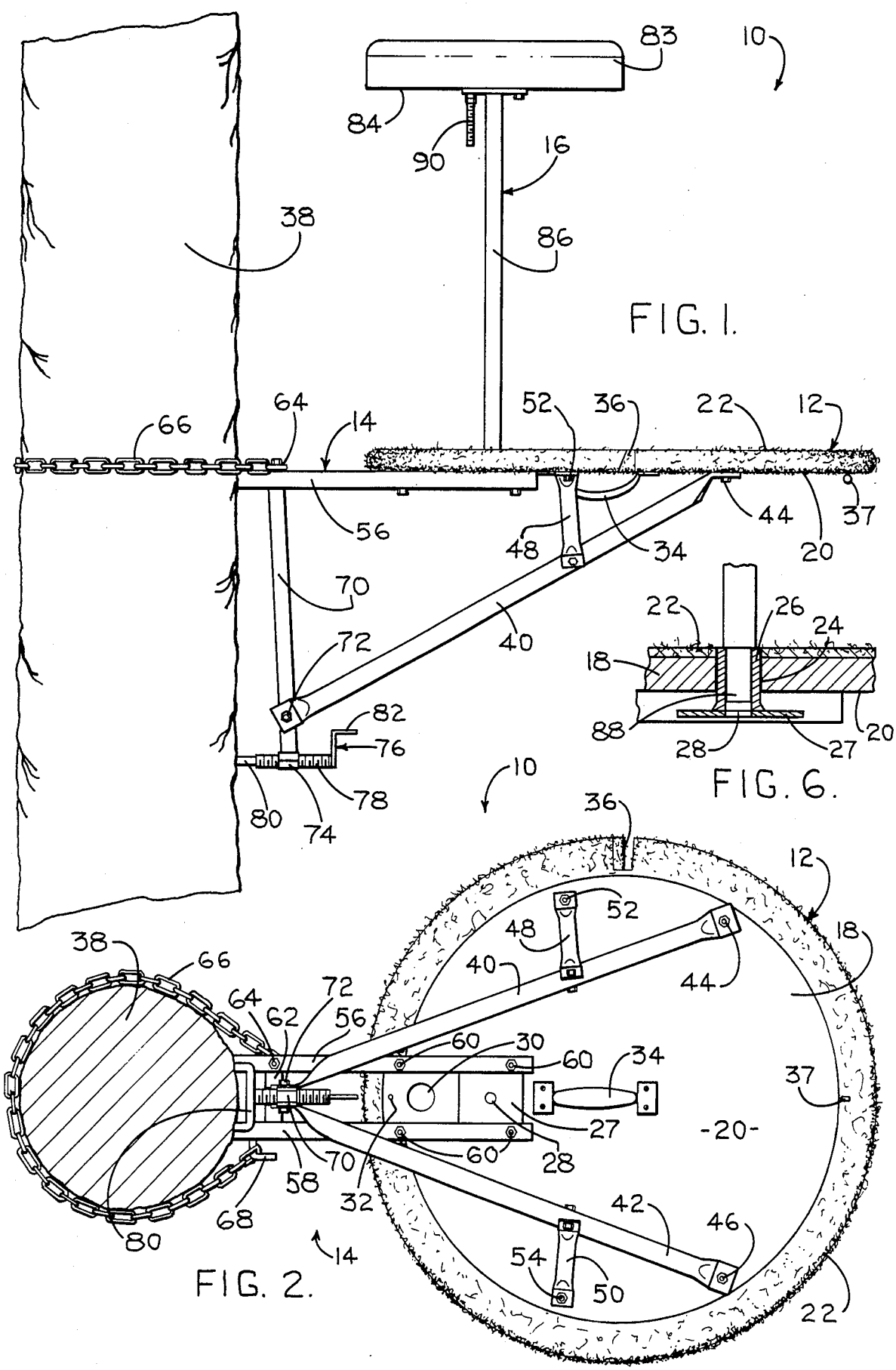

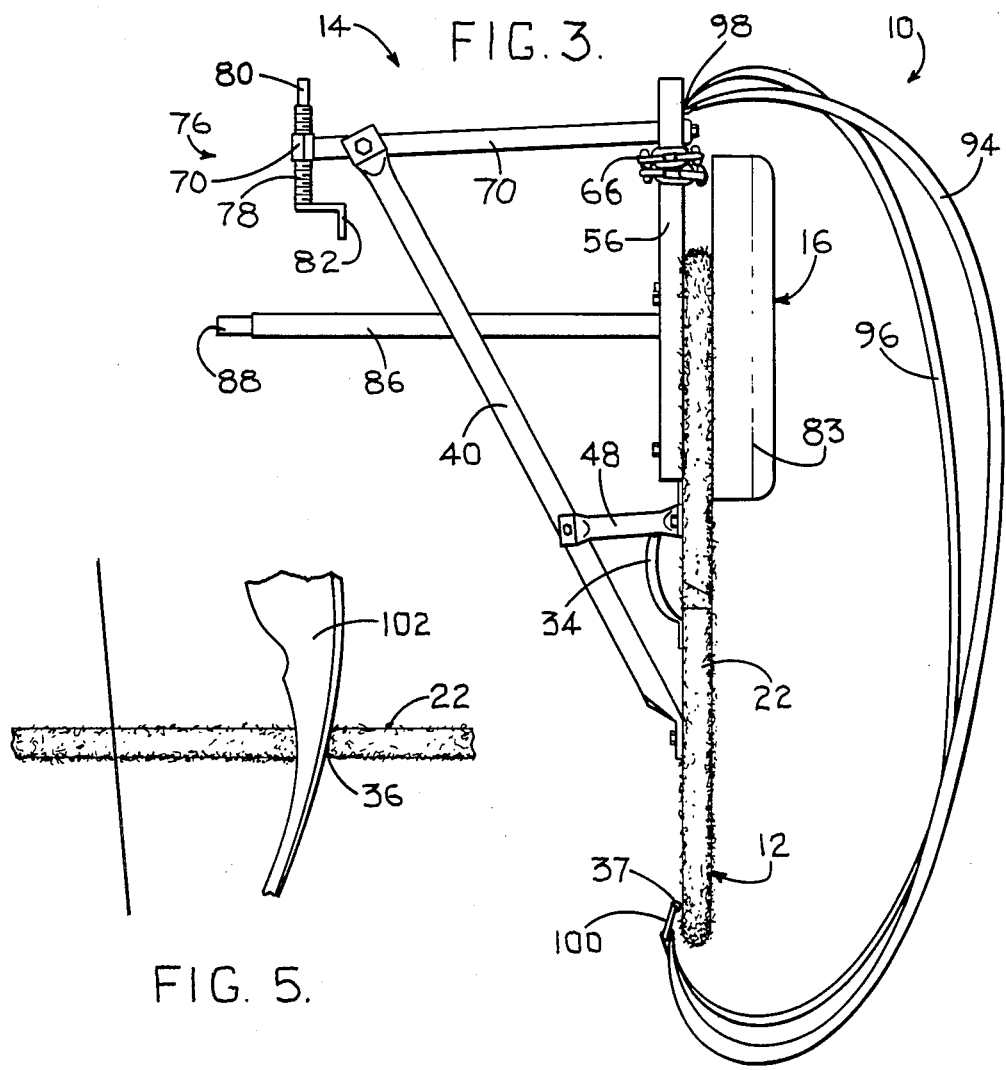
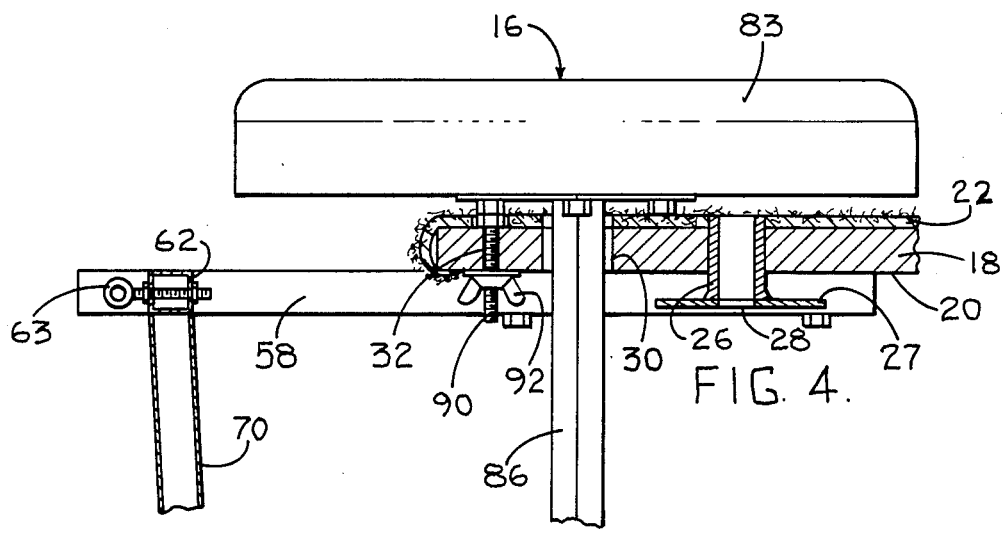

PORTABLE TREE STAND FOR HUNTERS

BACKGROUND OF THE INVENTION

1. Field of the Invention

The present invention is broadly concerned with an improved tree stand device of the type used by hunters in such endeavors as archery hunting. More particularly, it is concerned with such a tree stand which is characterized by a high degree of stability on the tree with a unique mechanism for leveling of the stand platform; at the same time, the stand assembly can be readily placed in a compact, collapsed condition for ease of carrying through thick brush and forest.

2. Description of the Prior Art

Bow and arrow hunters generally make use of various expedients for positioning themselves near streams or the like where wildlife tend to congregate. Thus, some hunters simply climb a nearby tree and sit on a branch while awaiting game. This practice can be very uncomfortable for the hunter, particularly if he must wait an undue length of time for the appearance of game. Moreover, a suitable tree may be difficult to find, and problems can arise in climbing the tree, particularly when carrying hunting equipment.

Accordingly, many hunters have adopted the practice of using so-called stands which are attached either temporarily or permanently to a suitable tree trunk. Commonly, such stands include a generally horizontal platform together with means for coupling the platform to a tree trunk, the latter usually comprising a plurality of tensile chains or cables attached to the tree trunk above the platform. These types of tree stands are deficient in that the upwardly extending mounting chains or cables inevitably impede the freedom of movement of the hunter when standing or seated on the platform. As a consequence, the hunter cannot freely move about on the stand and may therefore be hampered in his efforts.

Another problem associated with prior tree stands stems from the inability to readily level the platforms thereof. That is to say, many tree trunks are of irregular surface configuration and therefore it can be very difficult to position the platform in a truly horizontal orientation. As can be appreciated, having a level or nearly level platform is preferred, inasmuch as the hunter can more readily sit or stand on the platform without fear of falling.

Finally, existing tree stands are deficient in that they are typically very cumbersome to carry through the often dense brush and forest conditions where they are to be used. Thus, the hunter may be forced to make repeated trips to a selected tree site with components of the stand and necessary hunting equipment.

SUMMARY OF THE INVENTION

The problems outlined above are solved by the improved tree stand and the present invention which has the characteristics of outstanding stability, ready portability, and ease of installation including rapid leveling. As such, the tree stand hereof represents an important contribution to the art.

Broadly speaking, the preferred tree stand of the invention includes a platform (which may typically be of circular plan configuration), along with means for mounting the platform to the trunk of a tree in an elevated position above the ground. Advantageously, the mounting means includes obliquely extending, depending compression struts secured to the underside of the platform, with a screw-type leveling mechanism adapted to contact the tree trunk and provide the requisite degree of adjustability for leveling purposes.

Furthermore, the preferred tree stand of the invention has an upright seat which is mounted for full 360 degree rotation on the base platform. Inasmuch as the platform mounting structure is essentially completely below the upper surface of the platform, the hunter can rotate the seat as desired without any significant impediments being encountered. This in turn facilitates the hunter's efforts and allows complete freedom of movement.

In its collapsed, carrying condition, the tree stand of the invention can be readily carried on the back of the hunter. To this end, the rotatable seat is provided with a fixed, central support, and the latter is passed through an aperture provided in the platform so that the platform and seat are in close, face-to-face alignment. Carrying straps can be selectively secured to the collapsed stand and thus be worn on the back of the hunter.

BRIEF DESCRIPTION OF THE DRAWINGS

FIG. 1 is a side elevational view of the most preferred tree stand in accordance with the invention, shown mounted to the trunk of a tree;

FIG. 2 is a bottom view of the tree stand illustrated in FIG. 1;

FIG. 3 is a side elevational view of the tree stand in its collapsed, carrying condition, with carrying straps attached;

FIG. 4 is a fragmentary view in partial vertical section illustrating the orientation of the seat and platform when the stand is in its collapsed, carrying condition;

FIG. 5 is a fragmentary view illustrating placement of a hunting bow within a peripheral notch provided in the stand platform; and FIG. 6 is a fragmentary view in partial vertical section illustrating the rotatable connection between the seat assembly and platform.

DESCRIPTION OF THE PREFERRED EMBODIMENT

Turning now to the drawings, a tree stand 10 in accordance with the invention broadly includes a planar platform 12 having a mounting assembly 14 operatively secured thereto, together with a rotatable seat assembly 16.

In more detail, the platform 12 is in the form of a circular wooden body 18 presenting an underside 20 and an upper surface covered by carpeting 22. The platform 12 is provided with a first aperture 24 therethrough which receives a tubular metallic ferrule 26 (see FIG. 6). A rectangular connection plate 27 is affixed to the underside of ferrule 26, and is apertured as at 28. In addition, the platform 12 includes a relatively large passageway 30 therethrough. It will be seen that the passageway 30 is spaced radially outwardly relative to aperture 24. Finally, a second smaller aperture 32 is provided through the platform 12, with the aperture 32 being adjacent the outermost periphery of the platform (see FIG. 4).

The overall platform 12 further includes a central handle 34 which is secured to the underside 20 thereof. It will be observed that a beveled notch 36 is provided in the periphery of platform 12; the importance of this notch 36 will be explained hereinafter. Finally, a conventional eyelet 37 is affixed to the underside of platform 12 in spaced relationship to the apertures 24, 32 and passageway 30.

Mounting assembly 14 serves to releasably secure the platform 12 and related structure to the trunk 38 of a tree. In particular, the mounting structure 14 includes a pair of depending, obliquely oriented, converging compression struts 40, 42. Each of the struts 40, 42 is secured to the underside of platform 12 by means of a threaded fastener 44, 46, as best seen in FIGS. 1 and 2. Respective depending braces 48, 50 extend between the struts 40, 42 and the underside of platform 12 to provide additional support. It will be observed that the upper ends of each of the braces 48, 50 are secured to platform 12 by means of threaded fasteners 52, 54, whereas the lower ends of these braces are similarly connected by threaded means to the associated struts.

The mounting assembly 14 further includes a pair of elongated, generally radially extending, laterally spaced apart connector bars 56, 58. Each of these bars is secured to the underside of platform 12 by means of threaded fasteners 60, with the bars 56, 58 being oriented in straddling relationship to the apertures 24, 32 and passageway 30, and extending radially beyond the periphery of platform 12. It will also be seen that connector plate 27 for ferrule 26 is secured by welding to the respective connector bars 56, 58.

The outermost ends of the connector bars 56, 58 are interconnected by means of a cross-brace 62 to provide the requisite mechanical strength. An outwardly extending eyelet 63 (FIG. 4) is affixed to cross-brace 62 by means of a threaded connector. In addition, bar 56 has a bolt and nut assembly 64 therethrough which serves to affix one end of a metallic mounting chain 66 to the bar 56. The opposed connector bar 58 is provided with an L-shaped fixture 68 which is adapted to receive a selected link of chain 66. As will be appreciated from a study of FIGS. 1 and 2, chain 66 is wrapped about trunk 38 with the chain being held in a taut condition by the appropriate link being slipped over fixture 68.

A depending, slightly obliquely oriented connector leg 70 is fixedly secured to cross-brace 62 and extends between the lowermost ends of the struts 40, 42. In order to afford a rigid connection between these components, a bolt and nut assembly 72 is provided as illustrated. The lowermost end of leg 70 is in the form of an internally threaded, tubular collar 74 which is oriented with the axis thereof being substantially parallel with platform 12. Collar 74 receives a leveling screw mechanism 76 including an elongated, threaded shank 78 and a generally U-shaped, bifurcated trunk-engaging element 80 secured to the outermost end of the shank. A handle 82 is affixed to the inner end of shank 78 as best seen in FIG. 1, so as to facilitate rotation of the leveling screw mechanism.

Seat assembly 16 is in the form of a circular, padded seat 83 having a wooden base 84 and a depending metallic support 86 fixedly secured to the base 84. The end of support 86 remote from base 84 has a cylindrical coupling segment 88 which is sized to rotatively fit within ferrule 26 (see FIG. 6). In addition, an elongated threaded bolt 90 is affixed to and extends downwardly from base 84 for purposes to be made clear.

Referring particularly to FIGS. 3-4, the stand 10 is shown in its collapsed, carrying position. Specifically, in this position the support 86 affixed to seat 83 is passed through passageway 30 until the underside of the seat 83 abuts the carpeted upper surface of body 18. In this orientation, the bolt 90 passes through small aperture 32 (see FIG. 4), and a wing nut 92 is used to releasably secure the seat assembly 16 to the platform 12. The chain 66 is wrapped about the bars 56, 58 for stowage purposes, a spring loaded S-hook affixed to the free end of the chain may be used to hold the chain taut and eliminate rattle.

In order to facilitate carrying of the stand, a pair of shoulder straps 94, 96 are releasably connected to the opposed eyelets 63, 37. Such connection is afforded by means of respective spring clips 98, 100 secured to the opposed ends of the double strap assembly. In this condition, the entire stand assembly can be worn on the back of the hunter, much in the manner of a packpack. Inasmuch as body 18 is carpeted, and padded seat 83 is situated atop the carpeting, the entire assembly is exceedingly comfortable for the wearer.

In any event, when the hunter reaches a suitable tree, the stand is disassembled and the platform assembly is initially placed about the tree trunk. This involves elevating the platform to a desired height (typically by climbing temporary steps affixed to the trunk) whereupon chain 66 is passed around the trunk and pulled taut and affixed to fixture 68. The platform can then be leveled by making use of the screw mechanism 76, i.e., handle 82 is rotated until the bifurcated element 80 engages trunk 38. Adjustment of the position of shank 78 can then be completed to level the platform 12. In this respect, use of the bifurcated trunk-engaging element 80 ensures that a pair of spaced contact points are provided for maximum stability.

Seat assembly 16 is next attached to the platform, which involves merely inserting segment 88 of support 86 into ferrule 26 as illustrated in FIG. 6. This permits complete 360 degree rotation of the seat. Moreover, by virtue of the complete elimination of tensile chains or cables, no obstructions are encountered as the hunter rotates on seat 83. If desired, a bow 102 may be temporarily placed within peripheral platform notch 36. This places the bow in a ready condition for use, but does not require that the bow be constantly held by the hunter.

Obviously, after the hunt the stand 10 may be readily detached from the tree and reassembled in its collapsed condition for transport. This involves simply a reversal of the steps outlined above.

I claim:
1. A tree stand for hunters or the like, comprising:
a platform presenting an upper surface and an underside;
means operatively coupled with said platform and depending from said underside for mounting the platform to the trunk of a tree and in an elevated position;
a seat; and
means including an upright, elongated support coupling said seat to said platform for full 360 degree rotational movement of the seat about an upright axis,
said upright support being fixedly secured to said seat, said platform having an aperture therein, the end of said support remote from said seat being adapted for insertion into said platform aperture for rotation of the seat as desired,
the area above said platform upper surface being open and essentially free of trunk-connected mounting structure or the like whereby a person sitting on said seat may turn the seat as desired without impediments, said platform further including a passageway therethrough separate from said aperture, said passageway being of a diameter greater than the effective diameter of said support whereby said support may pass through the passageway for close alignment of the seat and platform when the stand is in a collapsed, carrying position, there being means for releasably securing said seat in said closely aligned, collapsed condition.

2. The tree stand of claim 1, including means defining a notch in the periphery of said platform for receiving and holding a bow.

3. The tree stand of claim 1, including a leveling screw mechanism operatively coupled to said platform mounting means below the underside of said platform.

4. The tree stand of claim 3, said leveling screw mechanism comprising a threaded member and a bifurcated trunk-engaging element adjacent one end of the threaded member.

* * * * *